United States Patent [19]

Quinlan

[11] Patent Number: 4,814,015
[45] Date of Patent: Mar. 21, 1989

[54] WATERBORNE NITROCELLULOSE COMPOSITIONS

[75] Inventor: George L. Quinlan, Martinsville, Va.

[73] Assignee: Prillaman Chemical Corporation, Martinsville, Va.

[21] Appl. No.: 82,585

[22] Filed: Aug. 7, 1987

[51] Int. Cl.$^4$ ............................................. C08L 1/18
[52] U.S. Cl. ................................. 106/170; 106/187; 106/189; 106/191; 106/195; 106/198
[58] Field of Search ............... 106/187, 170, 195, 198, 106/191, 189, 169

[56] References Cited

U.S. PATENT DOCUMENTS

| | | | |
|---|---|---|---|
| 2,510,834 | 6/1950 | Phillips | 106/170 |
| 2,792,314 | 5/1957 | Brown | 106/170 |
| 3,087,835 | 4/1963 | Aûer | 106/170 |
| 3,198,645 | 8/1965 | Plunguian | 106/170 |
| 3,265,722 | 8/1966 | Dudley | 252/551 |
| 3,458,458 | 7/1969 | Ferguson et al. | 524/176 |
| 3,522,070 | 7/1970 | Webb | 106/170 |
| 3,556,826 | 1/1971 | Gronholz et al. | 106/170 |
| 3,615,792 | 10/1971 | Keene | 106/198 |
| 3,919,156 | 11/1975 | Khanna et al. | 524/747 |
| 3,953,386 | 4/1976 | Murphy et al. | 524/716 |
| 3,985,691 | 10/1976 | De Taffin et al. | 524/716 |
| 4,064,294 | 12/1977 | Babil et al. | 106/312 |
| 4,294,739 | 10/1981 | Upson et al. | 428/519 |
| 4,374,670 | 2/1983 | Slocombe | 106/20 |
| 4,414,354 | 11/1983 | Slocombe | 524/460 |

FOREIGN PATENT DOCUMENTS 835262 2/1970 Canada .
0184127 11/1986 European Pat. Off. .
3338274 4/1985 Fed. Rep. of Germany .

OTHER PUBLICATIONS

McCutcheon's Emusifiers and Detergents, International Edition, p. 209, 1981.
McCutcheon's Emulsifiers and Detergents, North American Edition, p. 42, 1982.
Hercules Incorporated, Coatings Service Laboratory, "Preparation Procedures for Nitrocellulose Waterborne Coatings or Inks", Publication No. CSL-225.
Hercules Incorporated, Development Data, "Nitrocellulose Lacquer Emulsions for Clear Gravure Overprints", 12/6/82, pp. 1–5.
Hercules Incorporated, Coatings Service Laboratory, "Waterborne Nitrocellulose Coatings—Low-VOC Lacquer Emulsions for Wood", Publication No. CSL-219E.
Hercules Incorporated, Development Data, "Waterborne Inks Nitrocellulose Lacquer Emulsions for Graphic Arts", 10/1/80, pp. 1–4.
Hercules Incorporated Development Data, "High Solids Nitrocellulose Lacquer Emulsion", Publication No. CTG-D2.
Hercules Incorporated, Technical Information, "Nitrocellulose Lacquer Emulsions-Preparation and Performance for Improving Paper and Paper Products", Publication No. CSL-132C.

*Primary Examiner*—Paul Lieberman
*Assistant Examiner*—Helene Kirschner
*Attorney, Agent, or Firm*—Parkhurst, Oliff & Berridge

[57] ABSTRACT

Waterborne nitrocellulose compositions comprising nitrocellulose, at least one active solvent for the nitrocellulose, a plasticizer, water and an anionic ammonium-containing surfactant which decomposes upon heating. The waterborne nitrocellulose compositions are useful as coating compositions for printed metal foils and as such exhibit advantageous properties including water resistance, surface mar resistance, a low coefficient of friction, high gloss and a high degree of clarity. The nitrocellulose compositions are also characterized by rewet capability and rapid forced drying.

10 Claims, No Drawings

WATERBORNE NITROCELLULOSE COMPOSITIONS

BACKGROUND OF THE INVENTION

This invention relates to waterborne nitrocellulose compositions which are particularly useful as coatings for printed metal foils.

Coating compositions containing resins and/or nitrocellulose are well known for use with a variety of packaging materials such as polymeric films, paper, and metal foils. See, for example, U.S. Pat. No. 3,556,826 which relates to nitrocellulose coating compositions for use with films used in wrapping odor sensitive products. Although many of these known compositions comprise similar components such as a resinous material, a solvent for the resin, and additives such as plasticizers, surfactants, slip aids and the like, the requirements for such a coating composition vary widely depending upon the particular intended use of the composition. The coating composition requirements are determined by such diverse factors as the production apparatus and process by which coating is to be accomplished, the substrate material to be coated, the desired characteristics of the resultant coated product, and even environmental regulations governing the permissible level of volatile organic components in the coating composition.

Thus, a coating composition which exhibits acceptable characteristics with one type of substrate may be totally useless with a different substrate. Similarly, the particular production or coating process by which the coating composition is applied to the substrate significantly determines the suitability of a particular coating composition.

Coating compositions for printed metal foils, such as printed aluminum foil, must satisfy a large number of production, aesthetic and environmental requirements. In terms of production requirements, such coating compositions must exhibit rapid forced drying and maintain rewet on the applicator roll. "Rewet" refers to the ability of the composition, which has been permitted to partially dry on the applicator roll, to be redispersed in an applicator bath containing the coating composition, upon restarting the production process.

In addition, the coating composition must impart certain physical properties to the resultant coated metal foil. In particular, the coated metal foil must possess a low static coefficient of friction and a low and uniform kinetic coefficient of friction, water resistance and surface mar resistance. Aesthetically, the dried coating composition must exhibit a high degree of gloss and clarity, and must not emit any objectional odors. Further, the coating composition must contain a minimal amount of organic solvents in order to comply with environmental regulations which strictly limit the amount of volatile organic components which may be present therein.

None of the known coating compositions for metal foils exhibit the required combination fo physical, aesthetic and environmental characteristics. In particular, known waterborne nitrocellulose coating compositions do not exhibit both rapid forced drying after application and rewet on the application roll, and do not impart a sufficiently low coefficient of friction or water resistance to the resultant coated metal foil.

It is, therefore, an object of the present invention to provide a waterborne nitrocellulose composition which does not suffer from the disadvantags of known coating compositions.

Another object of the present invention is to provide a nitrocellulose composition which is useful for coating printed metal foils.

A further object of the present invention is to provide a waterborne nitrocellulose composition which provides rewet on the applicator roll and imparts water resistance to a coated product.

A still further object of the present invention is to provide a coating composition which exhibits a high degree of gloss and clarity when applied to a substrate.

Yet a further object is to provide a nitrocellulose composition which dries rapidly.

A still further object is to provide a coating composition which imparts surface mar resistance to the coated substrate.

Another object is to provide a coating composition with a low volatile organic chemical content which meets air quality regulations.

Still another object is to provide a waterborne coating composition with a high glass transition temperature ($T_g$) which allows desired properties to be achieved quickly after drying.

Additional objects and advantages of the present invention will be apparent to those skilled in the art by reference to the following description and the appended claims.

SUMMARY OF THE INVENTION

Waterborne nitrocellulose compositions of the present invention comprise nitrocellulose, a solvent system including at least one active or primary solvent for the nitrocellulose, a plasticizer, water and an anionic surfactant which decomposes upon heating. These waterborne nitrocellulose compositions are particularly useful as coating compositions for printed aluminum foils. The inventive nitrocellulose compositions are characterized by rewet capability and rapid forced drying. As coating compositions, the nitrocellulose compositions exhibit such desirable properties as water resistance, surface mar resistance, low coefficients of friction, high gloss and a high degree of clarity.

DETAILED DESCRIPTION OF THE INVENTION

According to the present invention, there are provided waterborne nitrocellulose compositions which comprise nitrocellulose, a solvent for the nitrocellulose, a plasticizer, water and an anionic surfactant which decomposes upon heating. The choice of surfactant is critical in the preparation of the nitrocellulose compositions of the present invention.

Nitrocellulose useful in the present waterborne nitrocellulose compositions has a viscosity of $\frac{1}{8}$- to 6-second, and preferably between $\frac{1}{4}$- and $\frac{1}{2}$-second. If the viscosity of the nitrocellulose is less than $\frac{1}{8}$-second, the waterborne nitrocellulose composition exhibits poor mar resistance, high coefficients of friction and low heat seal resistance when applied as a coating on a metal foil substrate. If the viscosity of the nitrocellulose is greater than about 6-second, the film-forming ability and flow out of the waterborne nitrocellulose composition are adversely affected, which can lead to a lack of clarity, poor gloss and lack of adhesion when the composition is used as a coating for metal foils.

Preferably, the nitrocellulose is a water-wet nitrocellulose having a solids content of from 68 to 72% by weight. Especially preferred nitrocellulose are water-wet nitrocelluloses having a viscosity of 174 - to ½-second and a solids content of 68 to 72% by weight.

The waterborne nitrocellulose compositions of the invention comprise 7.5–35% by weight wet nitrocellulose, based on the total weight of the waterborne nitrocellulose composition. Preferably, the nitrocellulose content of the invention composition is from 7.5 to 30%, and most preferably from 8.5–30%. If the nitrocellulose content is significantly greater than 35%, the waterborne nitrocellulose composition forms a brittle film which will not flow out and is not clear and glossy. Further, if the nitrocellulose content is too high, the waterborne nitrocellulose compositions of the present invention cannot be made due to the high melt viscosities associated with compositions having an extremely high nitrocellulose content. If the wet nitrocellulose content is less than about 7.5% by weight, the resultant film has an unacceptably low $T_g$ and thus is too soft. Films having a low $T_g$ exhibit inferior mar resistance, poor heat seal resistance and adversely affect the processing of the coated material due to a loss of slip caused by friction heat.

Waterborne nitrocellulose compositions of the present invention comprise at least on active or primary solvent for the nitrocellulose. The active solvent is a water-immiscible as possible, and has a boiling point of from 40° to 220° C. An active solvent is an oxygenated solvent such as an ester or a ketone. The active solvent is required to help the nitrocellulose composition to flow out as a film and allows the film to obtain adhesion, gloss and clarity. In addition, the active solvent must reduce the viscosity of the nitrocellulose composition as much as possible and must dry rapidly enough to be evaporated by a limited amount of heat while drying slowly enough to remain in a coating film until after all water has been evaporated from the film. The active solvent must be substantially water immiscible so that water is driven out of the film during drying and drying is thus accelerated. The water immiscibility of the active solvent also increases shelf stability, pot life and mechanical stability of the waterborne nitrocellulose composition. Preferably, the active solvent has little or no odor.

Many of the lacquer solvents known to dissolve nitrocellulose compositions are useful as the active solvent in the present nitrocellulose composition. Exmamples of suitable active solvents include: methyl acetate, ethyl acetate, n-propyl acetate, isopropyl acetate, isobutyl acetate, sec-butyl acetate, n-butyl acetate, isopentyl acetate, isoamyl acetate, methyl amyl acetate, primary amyl acetate, Cellosolve acetate, butyl Cellosolve acetate, diacetone alcohol, ethyl lactate, butyl Carbitol, methyl Carbitol, methyl amyl ketone, ethyl amyl ketone, methyl n-amyl ketone, dibutyl ketone, diisobutyl ketone, methyl isobutyl ketone, methyl n-butyl ketone, adipic acid succinate, oxyhexyl acetate, oxyheptyl acetate, isobutyl isobutyrate and cyclohexanone. Of these, the preferred active solvents are ester solvents, particularly lower alkyl acetates. An especially preferred active solvent is n-butyl acetate.

Preferably, the water borne nitrocellulose compositions of the invention comprise a solvent system which includes at least one active solvent as set forth above and may include a second active solvent, a co-solvent and/or a diluent. A co-solvent acts as a complement to the active solvent in dissolving the nitrocellulose. A diluent need not necessarily be a solvent for nitrocellulose and preferably is a non-oxygenated, inert substance which increases the bulk of the solution and improves flow and drying of the nitrocellulose compositions. Preferred solvent systems comprise at least two ester solvents. The co-solvents and diluents useful in the present invention are substantially water-immiscible. Examples of suitable co-solvents include alcohols such as methlisobutyl Carbinol, sec-amyl alcohol and butyl alcohol. Diluents useful in the solvent system include mineral spirits, naphtha, xylene and toluene. Other known co-solvents and diluents are also useful in this solvent system.

The solvent system comprises from about 7.5 to 30% by weight of the waterborne nitrocellulose composition. If the solvent content is too low, the nitrocellulose composition will not flow out properly as a film and will lose gloss, clarity and adhesion. If the solvent content is too high, the nitrocellulose composition will not satisfy air quality regulations. The combined total amount of co-solvents and/or diluents may be up to 20% by weight, based on the total weight of the nitrocellulose composition.

The inventive waterborne nitrocellulose composition further comprises 1.5–20%, preferably 2.5–15%, by weight of a plasticizer. Conventional plasticizers useful with nitrocellulose are suitable for use in the practice of the present invention. The plasticizer can be monomeric or polymeric and may be in the form of a liquid or solid. Examples of suitable plasticizer include: dicyclohexyl phthalate, tricyclohexyl citrate, 2-butoxywthyl pelargonate, N-ethyl p-toluenesulfonamide, N-cyclohexyl p-toluenesulfonamide, glyceryl tribenzoate, ethyl O-benzoyl benzoate, diisobutyl tartrate, N-cyclohexyl benzenesulfonamide, diphenyl phthalate, dihydrobiethyl phthalate, dibutyl phthalate, dimethyl phthalate, diisobutylcarbinyl phthalate, dioctyl phthalate, tricresyl phosphate, diphenyl 2-ethylhexyl phosphate, butyl phthalyl butyl gylcolate, ethyl phthalyl ethyl glycolate, diethyleneglycol monolaurate, 2-methoxyethyl acetyl ricinoleate, tributyl aconitate, cresyl phenyl phosphate, acetyl tributyl citrate, triethylene glycol pelargonate, dibutyl sebacate, dioctyl sebacate and tributyl tricarballylate. Especially preferred plasticizers include dialkyl phthalates, oil modified axelaic acids and tri-butoxyethyl phosphate.

Water comprises 25–75%, preferably 30–70% by weight of the waterborne nitrocellulose composition of this invention. The amount of water varies, depending upon the desired viscosity of the final nitrocellulose composition.

The choice of surfactant for use in the water borne nitrocellulose compositions of this invention is critical in order to produce a coating composition which exhibits the necessary properties both during the application and heating steps required to provide coated, printed metal foils and in the resultant coated product. A brief description of a typical coated printed material foil and process for the production thereof is necessary to fully understand the criticality of the surfactant in the nitrocellulose compositions of the present invention.

In a typical process, a metal foil, such as aluminum foil, is printed and then a transparent overprint coating layer is applied over the printed surface of the foil. From an aesthetic viewpoint, the coating should be glossy and clear, and should not react adversely with the printing ink or otherwise mar the appearance of the printed foil. The overprint coating composition is usually applied by a rotating gravure printing roll which turns partially immersed through an application bath of the coating composition and then contacts the printed foil thereby applying the coating composition thereto. After the coating has been applied, the coated foil is heated to dry the coating layer. Upon completion of the coating and heat assisted drying process, the coating layer must be water resistant and surface mar resistant in order to provide adequate protection for the underlying printed metal foil.

Generally, the coating process is a continuous process wherein the gravure printing or applicator roll is continuously rotating. However, when problems occur at any point along the production line, the rotation of the applicator roll must be temporarily stopped. When this rotation is stopped, the portion of the coating composition on the applicator roll which is exposed to air begins to dry. Build-up of dried coating composition on the applicator roll interferes with the proper application of the coating composition when production is resumed. It is difficult and time-consuming to remove dried coating composition from the applicator roll each time production is temporarily stopped. However, such clean-up is necessary with many known coating compositions, even when production is stopped for brief periods of time.

To obviate the need for this clean-up process, it is highly desirable to use a coating composition which is capable of rewet. "Rewet" means that a significantly dried coating composition on the applicator roll can be redispersed in the application bath, and thereby removed from the applicator roll, by restarting rotation of the applicator roll. In order to exhibit rewet, the significantly dried coating composition must be dispersible in the liquid coating composition after 10 minutes or continuous exposure to air. Thus, the coating composition must not undergo any change upon partially drying at ambient conditions which renders it nondispersible in the liquid coating composition. In the case of waterborne or aqueous coating compositions, the partially dried coating composition must remain water dispersible.

In the production of coated printed metal foils, the need for rewet must be balanced against a competing need to impart water resistance to the final coated printed metal foil. Thus, the coating composition must remain wtaer dispersible upon drying on the applicator roll and must also be water resistant in its final dried state as a protective coating for the printed metal foil. A coating composition which is water resistant in its final form as a coating on a printed metal foil product is said to exhibit "down-line water resistance".

Thus, it is highly desirable that a coating composition for printed metal foil exhibit both rewet and down-line water resistance. Heretofore, no nitrocellulose coating composition has been water dispersible after drying on the applicator roll, water resistant in final form and also satisfied the abovementioned requirements of gloss, clarity, surface mar resistance and rapid forced drying. The incorporation of a specific type of surfactant in the nitrocellulose compositions of the present invention provides coating compositions which exhibit the properties of rewet and down-line water resistance and also satisfy the numerous other requirements for printed metal foil coating compositions.

The surfactants useful in the present invention are anionic surfactants which decompose upon heating. Since these surfactants do not decompose upon exposure to ambient conditions during the 10 minutes rewet determining period, the nitrocellulose compositions remain dispersible in the liquid composition after partial drying on the applicator roll and, thus, exhibit rewet. However, upon heating the surfactant decomposes and volatile components are driven from the nitrocellulose composition. The decomposed surfactant no longer imparts water dispersibility to the nitrocellulose composition and the resultant nitrocellulose composition is water resistant after heating.

Many known, and widely used, surfactants are unsuitable for use in the present waterborne nitrocellulose compositions because they do not decompose upon heating to produce a composition which is not water dispersible. Particular surfactants which are useful in the waterborne nitrocellulose compositions of this invention are anionic ammonium-containing surfactants. The ammonium component of these anionic surfactants is driven off, upon heating, in the form of ammonia.

The anionic ammonium-containing surfactant is present in an amount sufficient to alter the surface tension of the water in the waterborne nitrocellulose composition, thereby ensuring proper emulsificatio of the components. Preferably, the anionic ammonium-containing surfactant comprises 2.5–35% by weight, most preferably 2.5 to 10% by weight, of the nitrocellulose composition.

Examples of anionic ammonium-containing surfactants useful in the present invention include: ammonium salts of sulfated nonylphenoxypoly(ethyleneoxy)ethanol, ammonium salts of sulfated dodecylphenoxypoly(ethyleneoxy)ethanol, ammonium lauryl ether sulfate, ammonium lauryl sulfate, ammonium salts of carboxylated polyelectrolytes, ammonium salts of sulfated and ethoxylated primary alcohols, ammonium salts of ethoxylate sulfate and ammonium salts of alcohol sulfates. Of these, an especially preferred surfactant is an ammonium salt of sulfated nonylphenoxypoly(ethyleneoxy)ethanol.

Nitrocellulose compositions of the present invention may further comprise minor amounts of conventional additives such as slip aids and/or defoamers. Each of these additives may be present in an amount of up to 2%. Examples of useful slip aids include polyethylene wax and naturally occuring waxes such as carnauba and sugar cane wax. Suitable defoamers include emulsified silicone compositions and emulsified petroleum distillates and hydrocarbons. The choice of a particular slip aid or defoamer is considered to be within the skill of those familiar with the coating composition art.

Although many known nitrocellulose compositions contain an acrylice resin component, the excellent coating composition properties of the waterborne nitrocellulose compositions of this invention do not require the use of acrylic resins. However, modifying resins such as maleic resins, rosin esters and high melt maleic rosin esters may be incorporated in the inventive nitrocellulose compositions in an amount up to about 10% by weight. The amount of plasticizer required in a nitrocellulose composition which includes a modifying resin is less than the amount required if a modifying resin is not present. Preferably, about 1.5 to 10% by weight of a plasticizer is used in nitrocellulose compositions which contain a modifying resin. Maleic resins provide high build to the compositions, rosin esters lower production costs and maleic rosin esters increase heat seal resistance of the inventive compositions.

As initially prepared, the waterborne nitrocellulose compositions have a viscosity of 20 to 1000 cps and a solids content of about 30 to 40% by weight. However, for a number of coating processes it is desirable to reduce the viscosity and solids content of the nitrocellulose compositions prior to coating the substrate. It has been unexpectedly found that the waterborne nitrocellulose compositions of this invention can be diluted with substantial quantities of water without adversely affecting their performance as coating compositions. Thus, water in an amount sufficient to reduce the viscosity to 20–25 cps and/or to reduce the solids content to as low as 5% by weight can be added to the present waterborne nitrocellulose compositions prior to use. Of course, the solids content and viscosity may be adjusted as necessary for particular applications.

Prior to dilution, the waterborne nitrocellulose compositions of the present invention generally comprise, by weight, 15–35% wet nitrocellulose, 15–30% solvent system, 3–20% plasticizer, 25–50% water nitrocellulose, 15–30% anionic ammonium-containing surfactant, 0–10% non-acrylic modifying resin, 0–2% slip aid and 0–2% defoamer. For use as a coating composition, i.e., after any necessary dilution, the waterborne nitrocellulose compositions of this invention comprise, by weight, 7.5–35% wet nitrocellulose, 7.5–30% solvent system, 1.5–20% plasticizer, 25–75% water, 2.5–35% anionic ammonium-containing surfactant, 0–10% non-acrylic modifying resin, 0–2% slip aid and 0–2% defoamer. Preferably, the waterborne nitrocellulose coating compositions of this invention comprise, by weight, 7.5–30% wet nitrocellulose, 7.5–30% solvent system, 2.5–15% plasticizer, 30–70% water, 2.5–10% anionic ammonium-containing surfactant, 0–10% non-acrylic modifying resin, 0–2% slip aid and 0–2% defoamer.

Preferably, the waterborne nitrocellulose compositions are slightly acidic or substantially neutral, with a pH of from 6.0 to 7.0. The pH of the nitrocellulose composition can be adjusted using conventional pH adjusting substances, such as dilute ammonium hydroxide. Caustic substances which could attack a metal foil should not be used to ajust the pH if the waterborne nitrocellulose composition is to be coated on a metal foil substrate.

Although one production process in which waterborne nitrocellulose compositions of this invention are useful has been described in detail above, it will be readily apparent that these nitrocellulose compositions may be applied by a variety of conventional methods, including roller coating, knife coating and spraying.

Waterborne nitrocellulose compositions of the invention may be prepared according to the following process. The active solvent, and any additional active solvents, co-solvents and diluents, are mixed with the plasticizer to produce a homogeneous mixture using conventional mixing apparatus. The resultant homegeneous mixture is heated to a temperature of about 62°0 to 79° C. The slip aid, if any, is added to the homogeneous mixture and dispersed therein. The nitrocellulose is then slowly added to the homogeneous mixture, with good agitation, and the nitrocellulose is dissolved therein to form a nitrocellulose solution. The temperature of the nitrocellulose solution is adjusted to from 45° to 57° C. and then the surfactant and the defoamer, if any, are added and dispersed evenly therein. The resultant nitrocellulose solution is allowed to cool to a temperature of from 40° to 45° C. and then water is added to produce a waterborne nitrocellulose composition of the present invention. The pH is subsequently adjusted as necessary.

The following example illustrates the production of a preferred embodiment of a waterborne nitrocellulose composition of the present invention and the superior characteristics thereof.

EXAMPLE

This example illustrates a preferred embodiment of the present invention.

120.0 grams of "Dibasic Ester 5" (Dupont), an active solvent, 540.6 grams of n-butyl acetate, an active solvent, 80.0 grams of isobutyl isobutyrate, another active solvent, and 610.4 grams of "Plastoflex 520" (Interstab Chemicals Inc.), a plasticizer, were mixed to produce a homogeneous mixture. "Dibasic Ester 5" comprises 0.1% by weight dimethyl adipate, 99% by weight dimethyl glutarate, 0.6% by weight dimethyl succinate and less than 0.1% by weight methanol.

The homogeneous mixture was heated to a temperature of 63° C. and 25.0 grams of "Polymist B-6" (Allied Chemical), a slip aid, were added. After dispersing the slip aid, 1348.8 g of 70% by weight, water-wet, ½-second, RS grade nitrocellulose were slowly added to the homogeneous mixture. As the viscosity of the mixture increased, agitation was increased such that a surface of the mixture was constantly moving in order to "wet" the nitrocellulose as it was being added. Good movement of the mixture is critical and the length of time required to dissolve the nitrocellulose is dependent thereon. Agitation was provided by the Cowles-type high speed disperser to produce a nitrocellulose solution.

After the nitrocellulose was completely dissolved, the temperature of the nitrocellulose solution was lowered to 46° C. and then 227 grams of an ammonium salt of sulfated nonylphenoxypoly(ethyleneoxy)ethanol ("Alipal CO-436", a product of GAF Corporation) was dispersed evenly in the nitrocellulose solution.

The nitrocellulose solution continued to cool to a temperature of equal to or less than 46° C. and then 481.0 grams of water were added slowly, over a period of 60 minutes, to produce a waterborne nitrocellulose emulsion composition. After the nitrocellulose composition has been emulsified, 16.0 grams of "Dehydran 671" (Henkel), a defoamer, was added to prevent foaming when the composition is let down with water. After the defoamer was dispersed, 1000.0 grams of water was added to produce a waterborne nitrocellulose composition having the desired viscosity. As water was added, the viscosity decreased and agitation was decreased accordingly to prevent air entrapment.

The rewet capability of the waterborne nitrocellulose composition was tested as follows. The viscosity of the nitrocellulose was adjusted to 40–60 cps. A conventional rotogravure press was used which included an application bath pan, a rotogravure cylinder which rotated partially immersed in an application bath contained in the pan, a doctor blade on the cylinder for ensuring coating uniformity and a rubber nip roll for adjusting the pressure between the substrate to be coated and the cylinder to ensure coating uniformity. The press oven was preheated to 149° C., the nitrocellulose composition was poured into the pan, the press was then started and the doctor blade was adjusted. The rubber nip roll was lowered and the press speed was adjusted to 60 ft/min. which gives a dwell time of 2 seconds in the downline drying oven. A few yards of metal foil were coated and then the press was stopped. The heat was cut off and the nip roll was raised, but the doctor blade was left on the cylinder. The press was stopped for an uninterrupted 10 minutes. The press was restarted, heat was turned on and the cylinder was permitted to rotate for 1 minute. Then the rubber nip roll was lowered and coating of the substrate resumed. The coated substrate was examined for uniformity of coating under a McBeth light. The substrate coated wihth the inventive waterborne nitrocellulose composition showed a continuous coating uniformity after restarting of the press, indicating that the inventive composition had good rewettability after 10 minutes exposure to air.

COMPARATIVE EXAMPLE

The procedure of the above Example was followed except the 227 grams of Alipal CO-436 were replaced by 227 grams of Gafac RE-610 (GAF Corporation), a free acid of complex organic phosphate ester commonly used as a surfactant in nitrocellulose compositions.

The comparative composition did not exhibit rewet on the applicator roll after 3 minutes, even though down-line water resistance was also poor.

Although the invention has been described with reference to particular embodiments thereof, it will be apparent to those skilled in the art that various changes and modifications can be made without departing from the spirit of the invention or from the scope of the appended claims.

I claim:

1. A waterborne nitrocellulose composition useful as a coating for printed metal foils, comprising:
    7.5 to 35% by weight wet nitrocellulose;
    7.5 to 30% by weight active solvent for said nitrocellulose;
    1.5 to 20% by weight plasticizer;
    25 to 75% by weight water; and
    2.5 to 35% by weight surfactant, said surfactant being selected from anionic ammonium-containing surfactants which decompose upon heating, with the proviso that a coating of said composition which has been exposed to air upon a stationary rotogravure cylinder for 10 minutes is substantially dispersible in said composition by rotation of said cylinder in a bath of said composition for 1 minute.

2. A waterborne nitrocellulose composition of claim 1 further comprising 0.1 to 2% by weight slip aid and 0.1 to 2% by weight defoamer.

3. A waterborne nitrocellulose composition of claim 1 further comprising 1 to 15% by weight ester solvent, said ester solvent being different from said active solvent.

4. A waterborne nitrocellulose composition of claim 1 wherein said surfactant is selected from the group consisting of ammonium salts of sulfated nonylphenoxypoly(ethyleneoxy)ethanol, ammonium salts of sulfated dodecylphenoxypoly(ethyleneoxy)-ethanol, ammonium salts of sulfated and ethoxylated primary alcohols, ammonium salts of ethoxylate sulfate and ammonium salts of alcohol sulfates.

5. A water borne nitrocellulose composition of claim 4 wherein said surfactant is an ammonium salt of sulfated nonylphenoxypoly(ethylenoxy)ethanol.

6. A water borne nitrocellulose composition of claim 1 comprising:
    12.5 to 355 by weight water wet nitrocellulose having a viscosity of ¼- to ½- second and a solids content of 68 to 72%;
    7.5 to 30% by weight active solvent selected from the group consisting of lower alkyl acetates:
    2.5 to 15% by weight plasticizer;
    30 to 70% by weight water; and
    2.5 to 10% by weight surfactant.

7. A waterborne nitrocellulose composition useful as a coating for printed metal foils, consisting essentially of:
    7.5 to 35% by weight water wet nitrocellulose having a viscosity of ¼- to ½- second and a solids content of 68 to 72%;
    7.5 to 30% by weight active solvent for the nitrocellulose, said active solvent being selected from the group consisting of lower alkyl acetates;
    0 to 20% by weight ester solvent, said ester solvent being different from said active solvent;
    1.5 to 15% by weight plasticizer;
    0.1 to 2% by weight slip aid;
    0.1 to 2% by weight defoamer;
    25 to 75% by weight water; and
    2.5 to 35% by weight surfactant, said surfactant being selected from the group consisting of anionic ammonium-containing surfactants which decompose upon heating;
    wherein the waterborne nitrocellulose composition has a viscosity of from 20 to 1000 cps, a solids content of 5 to 40% by weight, and a pH of 6.0 to 7.0, with the proviso that a coating of said composition which has been exposed to air upon a stationary rotogravure cylinder for 10 minutes is substantially dispersible in said composition by rotation of said cylinder in a bath of said composition for 1 minute.

8. A waterborne nitrocellulose composition of claim 7 wherein said surfactant is an ammonium salt of sulfated nonylphenoxypoly(ethyleneoxy)ethanol.

9. A process for producing a waterborne nitrocellulose composition comprising:
    7.5 to 35% by weight wet nitrocellulose;
    7.5 to 30% by weight active solvent for said nitrocellulose;
    1.5 to 20% by weight plasticizer;
    25 to 75% by weight water; and
    2.5 to 35% by weight ammonium-containing surfactant which decompose upon heating, said process comprising the steps of:
    mixing the active solvent and the plasticizer to from a homogenous mixture; and then
    heating the homogenous mixture to a temperature of 62° to 79° C.; and then
    slowly adding the nitrocellulose to the homogenous mixture with agitation to dissolve the nitrocellulose, thereby producing a nitrocellulose solution; and then
    adjusting the temperature of the nitrocellulose solution to from 45° and 57° C.; and then
    adding said surfactant to the nitrocellulose solution; and then
    allowing the nitrocellulose solution to cool to a temperature of 40° to 45° C.; and then
    adding water to the nitrocellulose solution to produce the waterborne nitrocellulose composition, with the proviso that a coating of said composition which has been exposed to air upon a stationary rotogravure cylinder for 10 minutes is substantially dispersible in said composition by rotation of said cylinder in a bath of said composition for 1 minute.

10. The process of claim 9 wherein said surfactant is an ammonium salt of sulfated nonylphenoxypoly(ethyleneoxy)-ethanol.

* * * * *